United States Patent
Boltze et al.

[11] 3,897,482
[45] July 29, 1975

[54] NOVEL 2-(3-TRIFLUOROMETHYLANILINO)-BENZOIC ACID COMPOUNDS

[75] Inventors: Karl-Heinz Boltze, Bensberg-Kippekausen; Otfried Brendler; Hans-Dieter Dell, both of Cologne; Haireddin Jacobi, Leichlingen, all of Germany

[73] Assignee: Troponwerke Dinklage & Company, Cologne, Germany

[22] Filed: Dec. 10, 1971

[21] Appl. No.: 206,923

[30] Foreign Application Priority Data
Dec. 16, 1970 Germany............ 2061948

[52] U.S. Cl........ 260/472; 260/471 R; 260/471 A; 260/518 A; 424/309; 424/319
[51] Int. Cl............ C07c 103/30
[58] Field of Search........ 260/471 R, 471 A, 518 A, 260/472

[56] References Cited
UNITED STATES PATENTS
3,678,094   7/1972   Shen et al. .............. 260/471 R Primary Examiner—Anton H. Sutto
Assistant Examiner—L. A. Thaxton
Attorney, Agent, or Firm—Burgess, Dinklage & Sprung

[57] ABSTRACT

Novel 2-(3-trifluoromethylanilino)-benzoic acid compounds of the formula

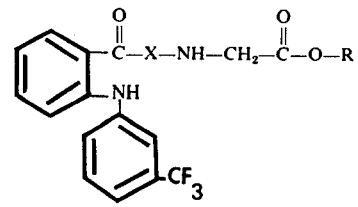

wherein X is

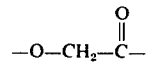

or a valence bond, and R is hydrogen or lower alkyl having from one to four carbon atoms have antiphlogistic properties and are substantially free of undesirable side effects.

8 Claims, No Drawings

NOVEL 2-(3-TRIFLUOROMETHYLANILINO)-BENZOIC ACID COMPOUNDS

This invention relates to new antiphlogistically active compounds of the general formula

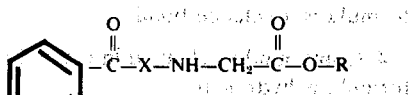
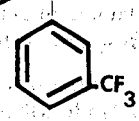

wherein X is

or a valence bond, and R is hydrogen or lower alkyl having from one to four carbon atoms.

It is known that 2-(3-trifluoromethylanilino)-benzoic acid has good antiphlogistic action (see Winder et al., Arthrit. Rheumat. 6, pp. 36–47 (1963); or Barnardo et al., Brit. med. J. 1966/II, pp. 342–343). However, the strongly acid properties of the compound, which may lead to disturbances of the gastrointestinal tract, have proven to be a disadvantage. It has therefore been proposed to use the aluminum salt in place of the free acid (see French Pat. No. 1,424,797), but undesirable side effects still subsisted when using the salt.

It has now been surprisingly found that the compounds of the general formula I above have a considerably lower toxicity with antiphlogistic action at least equivalent to that of 2-(3-trifluoromethylanilino)-benzoic acid. Whereas the $LD_{50}$ for 2-(3-trifluoromethylanilino)-benzoic acid was 550 mg/kg upon oral administration to the mouse, the corresponding values for the compounds according to the invention are all above 2,000 mg/kg. This lower toxicity, nearly four times less than the conventional compound, provides a far greater margin of safety in therapeutic applications.

The compounds of the general formula I according to the invention are prepared by reacting an alkali salt of 2-(3-trifluoromethylanilino)-benzoic acid with the corresponding N-(chloracetyl)-glycine ester in the case of esterification. In the case of an amidation, 2-(3-trifluoromethylanilino) benzoyl chloride is reacted with the corresponding glycine ester, advisably in a solvent at temperatures between 50° and 130° C. As solvents mainly those of polar character such as dimethylformamide and dioxane have proven useful. In order to prepare compounds of the general formula I, wherein R represents a hydrogen atom, the appropriate ester is subjected to an acid saponification according to known methods.

The invention further comprises pharmaceutical preparations for oral, intravenous or local administration, containing at least one compound according to the invention in addition to the customary carriers and auxiliary materials.

The following examples are illustrative of the present invention and should not be construed as unduly limitative thereof.

EXAMPLE 1

Preparation of N-([2-(3-trifluoromethylanilino)benzoyloxy] acetyl) glycine ethyl ester 8.8 g (0.027 mole) of the potassium salt of N-(3-trifluoromethylphenyl)anthranilic acid and 5 g (0.027 mole) of N-(chloracetyl) glycine ethyl ester were dissolved in 25 ml. of dimethylformamide and slowly heated to 85° C while stirring. Following a reaction period of five hours the precipitated potassium chloride was filtered off by suction and the solvent was evaporated. Subsequently, the residue was placed in water and extracted with ether. After washing the ethereal solution with water, the same was evaporated in a vacuum, and the crystals obtained were recrystallized from ethanol. Six grams (equivalent to 51.2% of theory) of N-(2-(3-trifluoromethylanilino)benzoyloxy acetyl) glycine ethyl ester were obtained. This ester had a melting point of 99°–100° C.

For $C_{20}H_{19}F_3N_2O_5$

|  | C | H | N |
|---|---|---|---|
| calculated: | 56.50%; | 4.52%; | 6.59% |
| found: | 56.53% | 4.62% | 6.65% |

EXAMPLE 2

Preparation of N-([2-(3-trifluoromethylanilino)benzoyloxy]acetyl) glycine 20 g (0.047 mole) of N-([2-(3-trifluoromethylanilino)benzoyloxy acetyl)glycine ethyl ester were dissolved in 100 ml of glacial acetic acid, added to 39 ml of 1N hydrochloric acid and boiled under reflux conditions for 1 hour. Thereupon the reaction mixture was poured into water and extracted with ether/chloroform. After removing the solvent and recrystallizing from ethanol 8.1 g of N-([2-(3-trifluoromethylanilino)benzoyloxy]acetyl)glycine were obtained having a melting point of 175° – 176° C.

For $C_{18}H_{15}F_3N_2O_5$

|  | C | H | N |
|---|---|---|---|
| calculated: | 54.54% | 3.81% | 7.06% |
| found: | 54.50% | 4.18% | 6.77% |

EXAMPLE 3

Preparation of N-[2-(3-trifluoromethylanilino)benzoyl]glycine ethyl ester 40 g (0.13 mole) of N-(3-trifluoromethylphenyl) anthraniloyl chloride were dissolved in 150 ml of dioxane, added drop by drop to a solution of 27 g (0.26 mole) of glycine ethyl ester in 150 ml of dioxane and subsequently mixed vigorously. The reaction mixture was poured into ice water, acidified with dilute hydrochloric acid, and the precipitate that formed was filtered off by suction. After washing the precipitate out with water until it reacted neutrally and recrystallizing from petroleum ether/ether, 27 g (= 56% of theory) N-[2-(3-trifluoromethylanilino)benzoyl] glycine ethyl ester were obtained having a melting point of 108°–109° C.

For $C_{18}H_{17}F_3N_2O_3$

| | C | H | N |
|---|---|---|---|
| calculated: | 59.01% | 4.64% | 7.45% |
| found: | 58.96% | 4.64% | 7.59% |

The compounds of this invention are useful for the therapy of articular rheumatic diseases and rheumatic diseases of soft tissues. A unitary dosage comprises 50 to 200 mg. of active ingredient, which can be administered three to four times per day.

It will be understood that the specification and examples are illustrative but not limitative of the present invention and that other embodiments within the spirit and scope of the invention will suggest themselves to those skilled in the art.

What is claimed is:

1. Compound of the formula

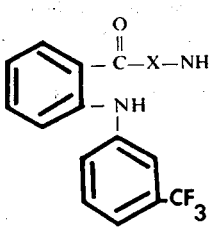

wherein X is —O—CH₂—CO— or a valence bond and R is hydrogen or lower alkyl of from one to four carbon atoms.

2. Compound as claimed in claim 1 wherein X in the formula is —O—CH₂—CO—.

3. Compound as claimed in claim 1 wherein X in the formula is a valence bond.

4. Compound as claimed in claim 1 wherein R in the formula is hydrogen.

5. Compound as claimed in claim 1 wherein R in the formula is alkyl of from one to four carbon atoms.

6. Compound as claimed in claim 1 designated N-([2-(3-trifluoromethylanilino)benzoyloxy]acetyl)glycine ethyl ester.

7. Compound as claimed in claim 1 designated N-([2-(3-trifluoromethylanilino)benzoyloxy]acetyl)glycine.

8. Compound as claimed in claim 1 designated N-[2-(3-trifluoromethylanilino)benzoyl]glycine ethyl ester.

* * * * *